S. ROBINSON.
GROMET.
APPLICATION FILED NOV. 29, 1918.
1,356,404.
Patented Oct. 19, 1920.
Fig. 1.
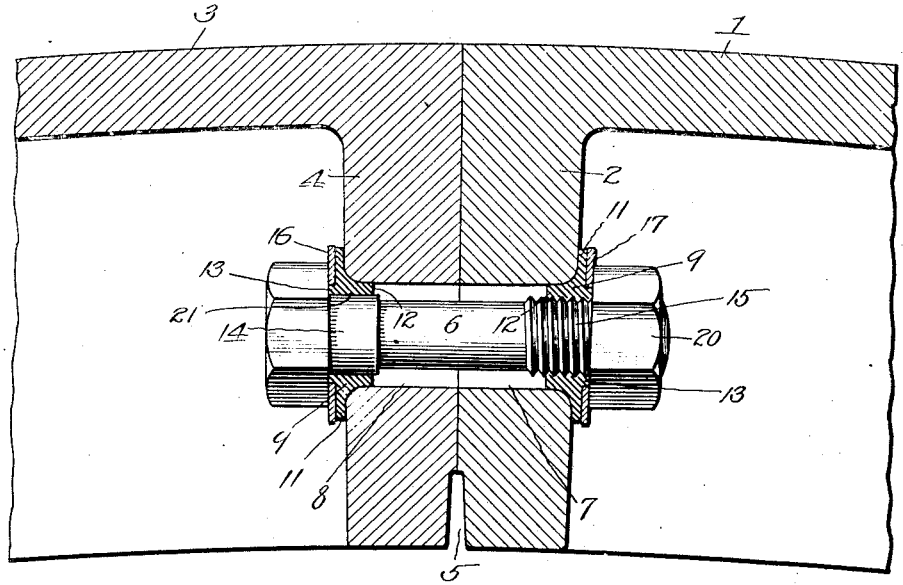
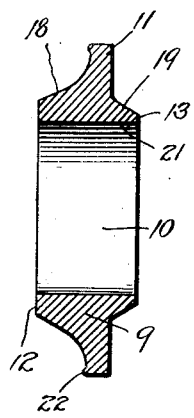
Fig. 2.
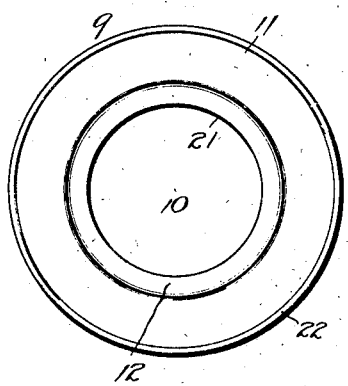
Fig. 3.
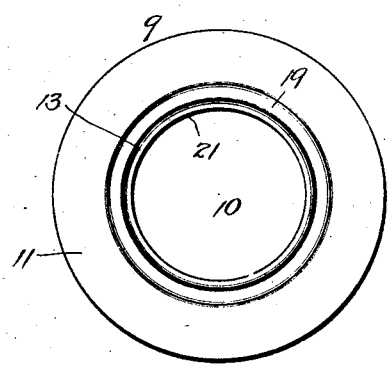
Fig. 4.
WITNESSES
Oliver W. Holmes
A. L. Kitchin
INVENTOR
SAMUEL ROBINSON
BY Munn & Co
ATTORNEYS

UNITED STATES PATENT OFFICE.

SAMUEL ROBINSON, OF NEW YORK, N. Y.

GROMET.

1,356,404.	Specification of Letters Patent.	Patented Oct. 19, 1920.

Application filed November 29, 1918. Serial No. 264,651.

*To all whom it may concern:*

Be it known that I, SAMUEL ROBINSON, a subject of the King of Great Britain and Ireland, and a resident of the city of New York, Astoria, borough of Queens, in the county of Queens and State of New York, have invented a new and Improved Gromet, of which the following is a full, clear, and exact description.

This invention relates to packing devices and particularly to what is known as a gromet and has for an object the provision of an improved construction which will effectively prevent leaks around a bolt when the nut is properly tightened.

Another object in view is to provide a gromet with radially positioned flanges and two laterally positioned flanges for engaging the nut or washer and the article clamped by the bolt when the gromet is used in connection with a bolt.

A still further object of the invention is to provide a gromet of lead composition or other yielding material which will have a radial flange as well as a lateral annular flange so that when placed adjacent a nut on a bolt and the nut is tightened the flanges will accommodate themselves to the adjacent surfaces to the extent of being pressed into the adjacent surfaces including the threads in order to produce an absolutely tight joint or connection.

In the accompanying drawing:

Figure 1 is a sectional view through part of a casing similar to that used in tubes passing under water ways, the same being shown in connection with an embodiment of the invention.

Fig. 2 is a longitudinal vertical section through a gromet disclosing the invention.

Fig. 3 is a front view of the gromet shown in Fig. 2.

Fig. 4 is a rear view of the gromet shown in Fig. 2.

Referring to the accompanying drawings by numerals 1 indicates a plate having a depending web 2 and 3 a similar plate having a web 4, said webs abutting. In providing tubes for trains or other purposes passing beneath bodies of water it is necesary to have the flanges 2 and 3 clamped together for the purpose of strength and also for preventing the passage of water into the tube. To positively produce a tight joint packing is arranged in the notch 5 which is calked in the usual manner of calking ships and similar structures. The flanges 2 and 3 are connected together by bolts 6 passing through suitable openings in the flanges as shown in Fig. 1. Ordinarily water will leak through the joint between the flanges and out through the bolt openings 7 and 8, to prevent this a number of rope gromets have been used heretofore and also other constructions, but sometimes it has been found necessary to completely fill the openings 7 and 8 with rope gromets saturated with a solution before the joint has been made completely tight. This is expensive and requires an appreciable amount of work in placing these gromets in position until the proper tightness is secured. To overcome this objection and to provide a positively tight connection a lead or composition gromet 9 is used adjacent each end of the bolt 6. The gromet 9 is of special construction and may be made from lead or other metal which will flow to a certain extent when under great pressure. Ordinarily the gromet is made with a smooth bore 10, a radial flange 11 and lateral flanges 12 and 13. The bore 10 is made sufficiently large to slide reasonably freely over the ends of the bolts 6 so that at one end the gromet loosely fits the enlargement 14 of the bolt and at the other loosely fits on top of the threads 15. On arranging the gromet 9 in place the comparatively large, heavy lateral flange 12 is caused to extend into the respective openings or bores 7 and 8, while the comparatively small lateral flange 13 projects within the respective washers 16 and 17, said washers being usually steel or other comparatively hard metal. It will be observed that both of the flanges 12 and 13 are beveled as for instance at 18 and 19 so that part of the flanges will project into the bores 7 and 8 respectively and into the respective washers 16 and 17. When the nut 20 is tightened the flanges 12 and 13 will be forced farther and farther into their respective openings in the flanges 2 and 4 and in the washers. In addition the inner face of what may be termed the body 21 of the gromet 9 is forced into the threads 5 so as to tightly fit the same and thereby prevent any leakage at this point. The radial flange 11 is also forced tightly against the outer surface of the respective flanges 2 and 4 and consequently they are embedded in the irregularities thereof. By providing lead, or some other metal having substantially the same characteristics, only two gromets are necessary to produce a permanent tight joint and when once placed in position no further action is necessary. Heretofore when using the rope gromet after the parts had been placed in position a leak would quite often occur after a few days. When a leak would occur with the gromet heretofore in use it was necessary to remove the nut and place one or more additional gromets in place. In the present construction a positively tight joint is provided when the parts are properly placed in position. If, for any reason, the nut 20 should not be tightened sufficiently and a leak should occur it will only be necessary to give the nut 20 one or more turns and the metal of the gromets will be forced tightly into place and thereby produce the tight joint desired. If desired a small bead 22 could be provided on one face of the radial flange 11 so as to positively insure a connection adjacent the periphery thereof, said bead 22 being forced against and into the flanges 2 and 4. This gromet is designed primarily to provide tight joints in built up tubes for tunnels under water ways, but it is evident that same may be used readily in other places without departing from the spirit of the invention, the same being always used in connection with a bolt. If desired, under some circumstances the flange may be reduced or eliminated, though ordinarily this is extremely desirable.

What I claim is:

1. A gromet for tunnel casings and bolt therefor comprising a tubular body having a thickened central portion merging into a radiating flange, said body and flange being formed from material having the characteristic of lead so as to flow into the threads and irregularities of said bolt and irregularities of said casing when applied to the bolt and the nut tightened.

2. A gromet for tunnel casings and bolts comprising a tubular body formed thicker at a central point than at the ends and tapering on the outer surface from the ends outwardly, said tapering structure merging into a radial flange, so that there will be in effect a washer structure and a tubular sleeve surrounding the bolt when in use.

3. A gromet for packing bolts in tunnel casings formed of material which will flow when under comparatively high pressure, constructed with a substantially tubular body having a centrally arranged radially extending flange, said body having the outer surface thereof tapering from the flange to the end of the body whereby there is presented a thick section at the juncture of the flange and body.

4. A gromet for bolts comprising a body having a bore for accommodating a bolt, the upper part of said body tapering in opposite directions from a substantially central point; and a substantially centrally arranged annular radial flange projecting from the body, said flange being formed with an annular bead on one side near the periphery.

SAMUEL ROBINSON.